United States Patent
Hung

(10) Patent No.: US 12,523,336 B2
(45) Date of Patent: Jan. 13, 2026

(54) SUPPORT DEVICE WITH AN EXTENSION ARM

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 23 days.

(21) Appl. No.: 18/809,477

(22) Filed: Aug. 20, 2024

(65) Prior Publication Data

US 2025/0102104 A1    Mar. 27, 2025

(30) Foreign Application Priority Data

Sep. 22, 2023 (TW) ................. 112136177

(51) Int. Cl.
*F16M 11/12* (2006.01)
*F16M 11/20* (2006.01)

(52) U.S. Cl.
CPC ....... *F16M 11/125* (2013.01); *F16M 11/2064* (2013.01); *F16M 2200/04* (2013.01); *F16M 2200/045* (2013.01); *F16M 2200/047* (2013.01)

(58) Field of Classification Search
CPC ........ F16M 2200/04; F16M 2200/041; F16M 2200/045; F16M 2200/047; F16M 2200/06; F16M 2200/063; F16M 11/125
USPC .......... 248/123.11, 123.2, 125.7, 162.1, 404, 248/292.11, 297.11
See application file for complete search history.

(56) References Cited

U.S. PATENT DOCUMENTS

| 2004/0245419 | A1* | 12/2004 | Sweere | F16M 11/105 248/278.1 |
| 2006/0186281 | A1* | 8/2006 | Thiessen | F16M 11/2014 408/187 |
| 2007/0221794 | A1* | 9/2007 | Li | F16M 13/02 248/124.1 |
| 2007/0295870 | A1* | 12/2007 | Peterson | F16M 13/02 248/125.7 |
| 2011/0260017 | A1* | 10/2011 | Monsalve | F16M 13/022 248/201 |

(Continued)

FOREIGN PATENT DOCUMENTS

| CN | 202834623 U | 3/2013 |
| CN | 217356185 | 9/2022 |

OTHER PUBLICATIONS

Search Report appended to an Office Action, which was issued to Taiwanese counterpart application No. 112136177 by the TIPO on Jun. 21, 2024, with an English translation thereof.

*Primary Examiner* — Alfred J Wujciak
(74) *Attorney, Agent, or Firm* — Burris Law, PLLC

(57) ABSTRACT

A support device includes a support bracket unit mounted on a fixed object, an extension arm unit swingably connected with the support bracket unit to support a movable object, and a flexible unit connected with the extension arm unit and the support bracket unit. The flexible unit includes a stretchable and retractable biasing member and at least one rolling member rollably mounted on the biasing member to slide along the extension arm unit during stretching and retraction of the biasing member. With the rolling member, straightness of the biasing member is maintained, and frictional resistance to the biasing member is decreased so as to enhance smooth operation of the extension arm unit.

8 Claims, 13 Drawing Sheets

(56) References Cited

U.S. PATENT DOCUMENTS

| | | | |
|---|---|---|---|
| 2012/0138754 A1* | 6/2012 | Lim | F16M 11/24 |
| | | | 248/65 |
| 2012/0267497 A1* | 10/2012 | Bowman | F16M 13/022 |
| | | | 248/280.11 |
| 2021/0156513 A1 | 5/2021 | Borg | |
| 2022/0150612 A1* | 5/2022 | Wu | F16M 11/2064 |

* cited by examiner

SUPPORT DEVICE WITH AN EXTENSION ARM

CROSS-REFERENCE TO RELATED APPLICATION

This application claims priority to Taiwanese Patent Application No. 112136177, filed on Sep. 22, 2023, and incorporated by reference herein in its entirety.

FIELD

The disclosure relates to a support device with an extension arm, and more particularly to a support device for supporting a portable device such as a microphone, camera, etc.

BACKGROUND

Referring to FIG. 1, a conventional extension arm device 1 disclosed in CN217356185 includes a base seat 11, a lower arm 12 swingably connected with the base seat 11, an upper arm 13 swingably connected with the lower arm 12 for supporting a microphone (not shown), and a force transmitting mechanism (not shown) disposed within the lower arm 12. The force transmitting mechanism has a gas piston to transmit the counteracting force from the upper arm 13 to the base seat 11 by a compression action thereof for bearing the upper arm 13 at a variety of swing angles.

Since the length of the gas piston is changed in accordance with the swing angle of the upper arm 13, the gas piston is liable to be deformed and warped when the gas piston is elongated and suspended due to the angle variation and the counteracting force of the upper arm 13. The warping and deformation may cause undesired resistance during the movement of the gas piston to render the swing operation of the upper arm unsmooth.

SUMMARY

Therefore, an object of the disclosure is to provide a support device that can alleviate at least one of the drawbacks of the prior art.

According to the disclosure, the support device includes a support bracket unit, an extension arm unit and a flexible unit. The support bracket unit includes a suspending arm and a base seat which is rotatably connected with the suspending arm about a first axis. The base seat has a first stop surface which extends along a direction of a second axis that is transverse to a direction of the first axis, and two second stop surfaces which extend along a direction of the first axis opposite to the first stop surface. The extension arm unit includes a swing arm which is pivotably connected with the support bracket unit about the second axis and swingable along an up-down direction relative to the support bracket unit between an uppermost position and a lowermost position. The swing arm has a first abutting surface which faces the base seat, and an inner surface which is formed with two second abutting surface portions that face the base seat. The first abutting surface abuts against and is stopped by the first stop surface to keep the extension arm unit at the uppermost position. The second abutting surface portions respectively abut against and are stopped by the second stop surfaces to keep the extension arm unit at the lowermost position. The flexible unit extends along a lengthwise direction and is connected with the extension arm unit and the support bracket unit. The flexible unit includes a biasing member which is stretchable and retractable along the lengthwise direction, and at least one rolling member which is rollably mounted on the biasing member to slide along the extension arm unit during stretching and retraction of the biasing member. With the rolling member, the straightness of the biasing member is supported and maintained, and the frictional resistance to the biasing member during the stretching and retraction thereof is decreased so as to enhance smooth operation of the extension arm unit.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
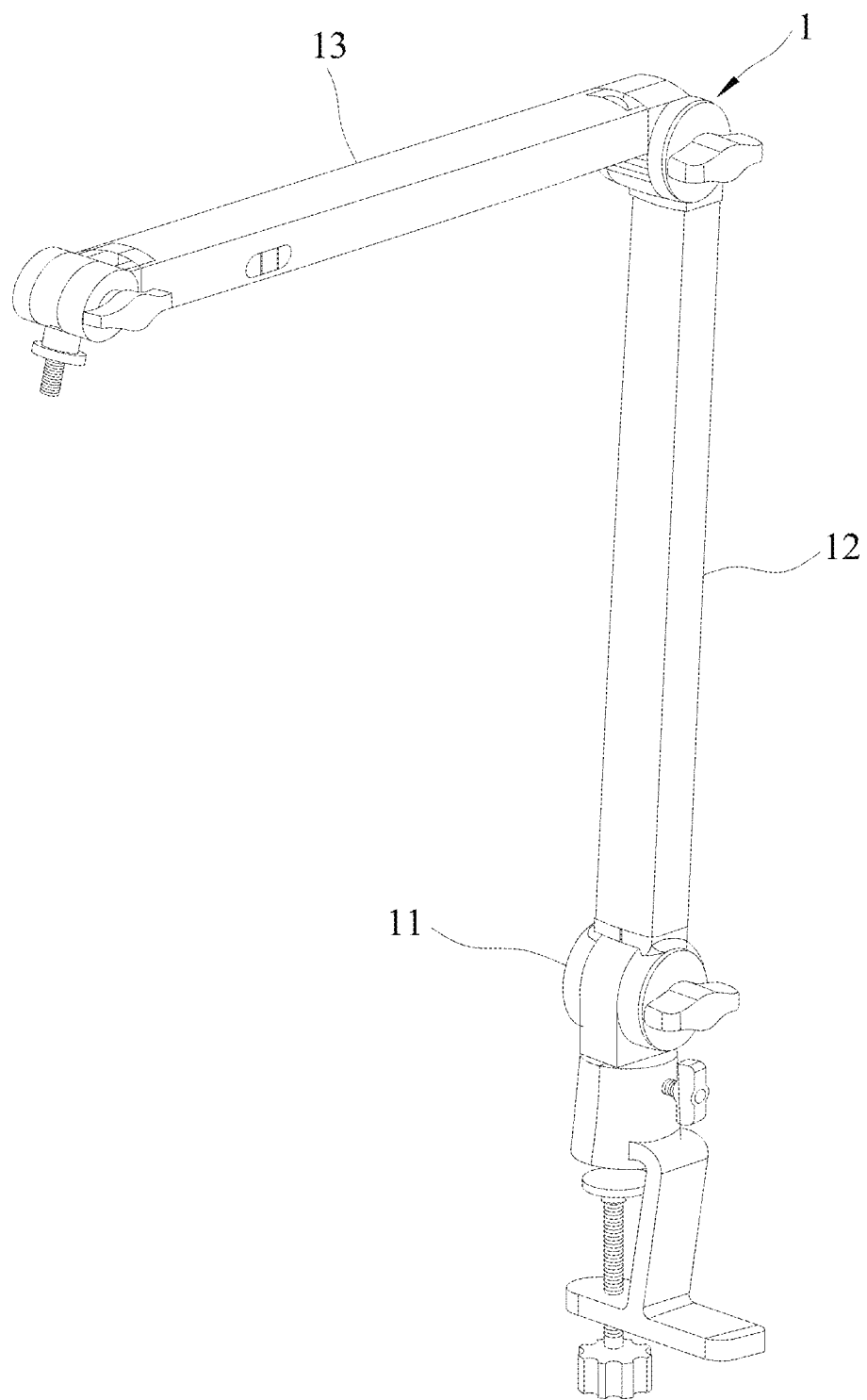
FIG. 1 is a perspective view of a conventional extension arm device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 2 to 5, an embodiment of a support device according to the disclosure is adapted to connect with a fixed object 21 and a portable object 22. For example, the fixed object 21 may be a table or a platform. The portable object 22 may be a microphone, a phone, a tablet, or other portable devices. The support device includes a support bracket unit 3, an extension arm unit 4, a carrying unit 5, a flexible unit 6, an adjusting unit 7 and a preloaded unit 8.

The support bracket unit 3 is adapted to be connected with the fixed object 21, and includes a suspending arm 31 and a base seat 32. The suspending arm 31 has an insert hole 311 formed in an end portion and extending along a first axis (X1) in an up-down direction (Z). The base seat 32 is rotatably connected with the suspending arm 31 about the first axis (X1). Specifically, the base seat 32 has a stem 321 inserted into the insert hole 311, two plate walls 322 spaced apart from each other along a second axis (X2) that is substantially transverse to the up-down direction (Z), and a first stop surface 323 formed between upper ends of the plate walls 322 and extending along a direction of the second axis (X2). The plate walls 322 and the first stop surface 323 cooperatively define a moving space 324. Each plate wall 322 has a second stop surface 325 which substantially extends along a direction of the first axis (X1) and is formed adjacent to a lower end of the plate wall 322 and formed opposite to the first stop surface 323. The first stop surface 323 has a notch 326.

The extension arm unit 4 is connected with the base seat 32 so as to be rotatable about the first axis (X1), and extends along a lengthwise direction (L) of its length. The extension arm unit 4 includes a swing arm 41, a lower seat 42, four magnets 43, a cover plate 44 and a pivot shaft 45.

The swing arm 41 is connected with the plate walls 322 and is pivotable about the second axis (X2) to be swingable along the up-down direction (Z) relative to the support bracket unit 3. Specifically, the swing arm 41 is tubular and has a lower opening. The swing arm 41 has a first end portion 411, two second end portions 412 opposite to the first end portion 411 and spaced apart from each other along the second axis (X2), a sleeved portion 413 connected with the first end portion 411, a first abutting surface 414 formed between the second end portions 412 and extending along the direction of the second axis (X2), two second abutting surfaces 415 formed on an inner surface of the swing arm 41 and adjacent to the second end portions 412, and two rail surface portions 416 formed on the inner surface and adjacent to the second end portions 412. The first abutting surface 414 has a protrusion 417 extending along the lengthwise direction (L). The rail surface portions 416 face the lower seat 42 and extend along the lengthwise direction (L). The rail surface portions 416 are spaced apart from each other in the direction of the second axis (X2) and from the lower seat 42 in the direction of the first axis (X1). The lower seat 42 is mounted on the swing arm 41 to cooperate with the swing arm 41 to define a mounting space 401. The magnets 43 are disposed on a lower surface of the lower seat 42 opposite to the swing arm 41. The cover plate 44 is attractively attached to the magnets 43 to cover the lower opening of the swing arm 41, and cooperates with the lower seat 42 and the swing arm 41 to define a wiring space 402. The cover plate 44 has two arcuate edges 441 which cooperate with the swing arm 41 to define two wiring access openings 440 for a wiring assembly (not shown) to pass therethrough and be received in the wiring space 402. The pivot shaft 45 extends through the plate walls 322 and the second end portions 412 to permit the swing arm 41 to be pivotably connected with the base seat 32.

Figure 6:
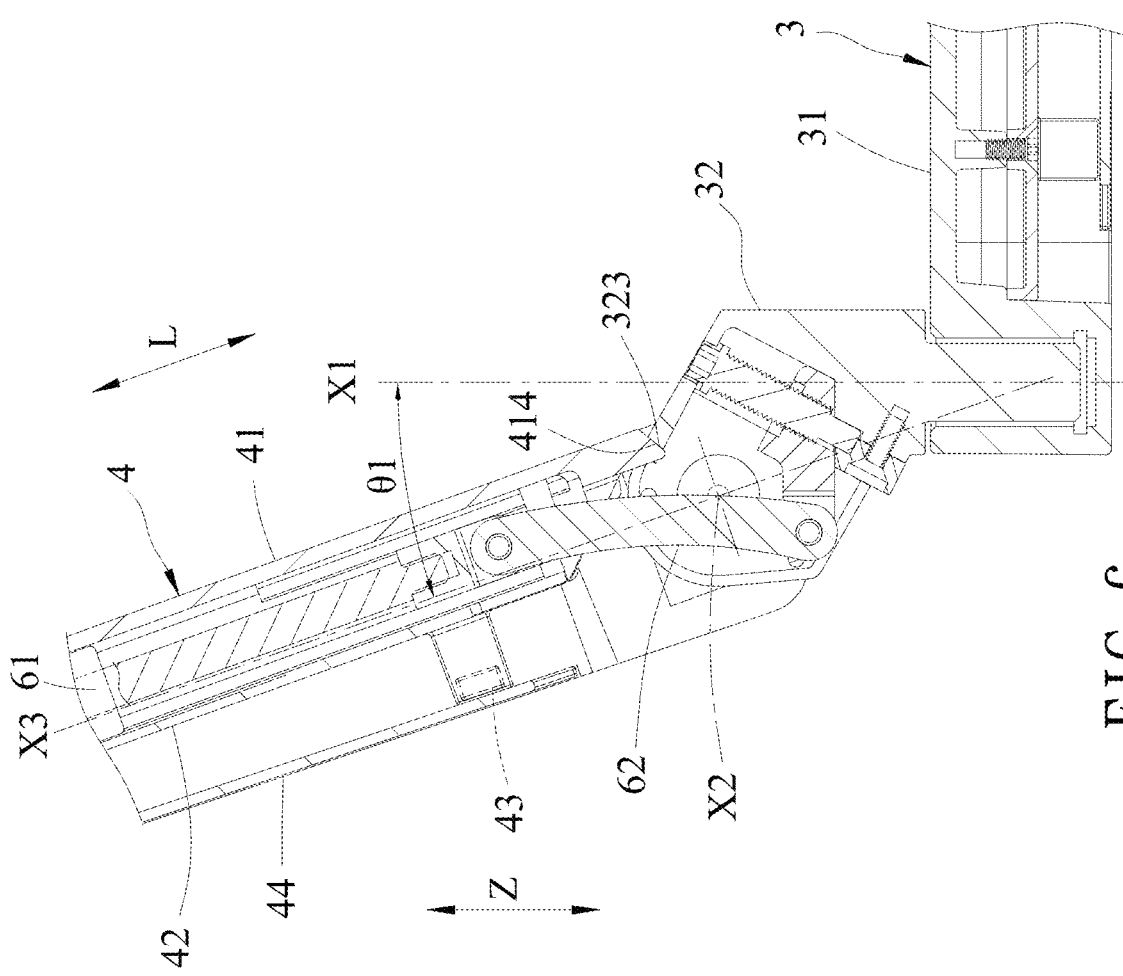
FIG. 6 is a fragmentary sectional view illustrating an extension arm unit of the embodiment in an uppermost position.
Figure 7:
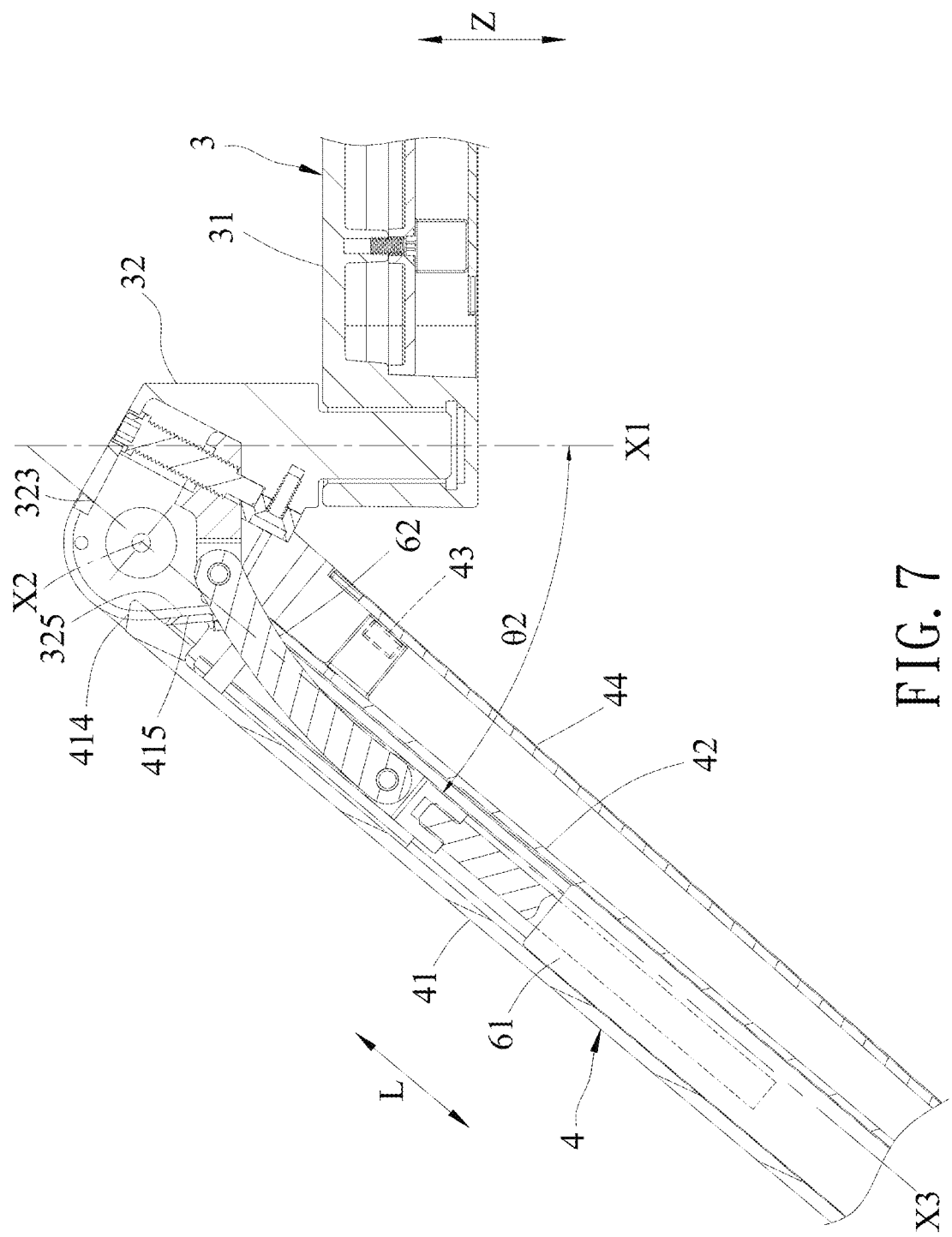
FIG. 7 is a fragmentary sectional view illustrating the extension arm unit in a lowermost position.
Figure 8:
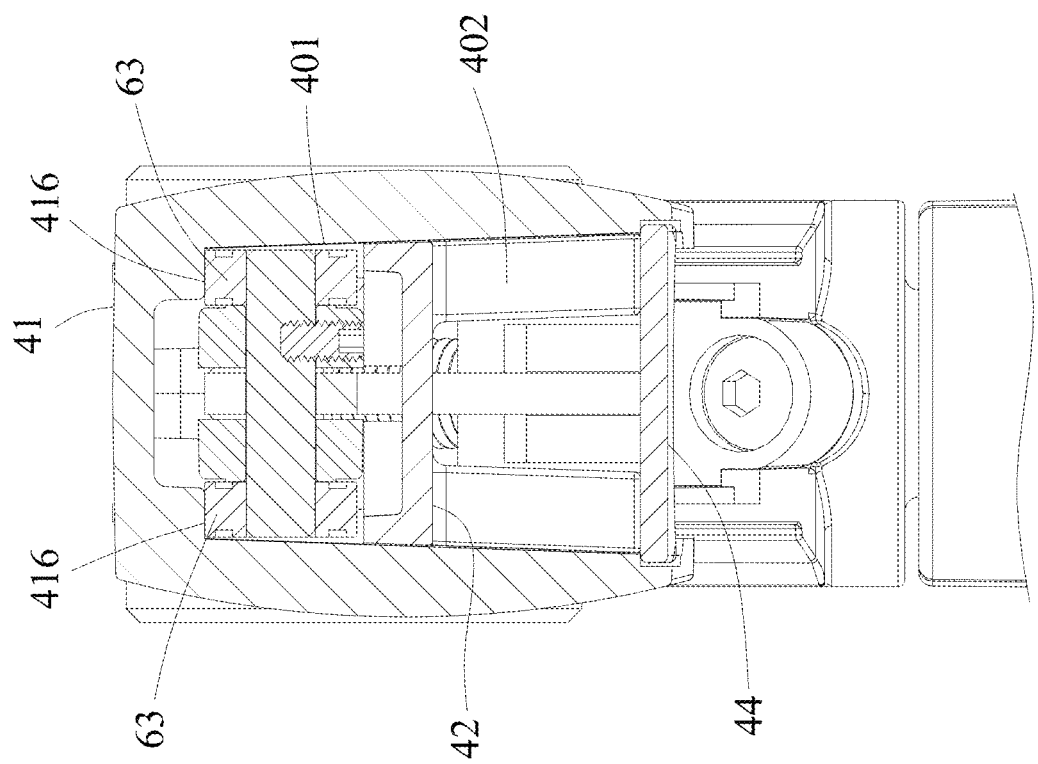
FIG. 8 is a sectional view taken along line VIII-VIII of FIG. 5.

With reference to FIGS. 3, 4, 6 and 7, the extension arm unit 4 is swingable along the up-down direction (Z) relative to the support bracket unit 3 between an uppermost position (as shown in FIG. 6) and a lowermost position (as shown in FIG. 7). At the uppermost position, the first abutting surface 414 of the swing arm 41 abuts against and is stopped by the first stop surface 323 of the base seat 32, and the protrusion 417 is engaged in the notch 326 to keep the extension arm unit 4 at the uppermost position, and the extension arm unit 4 intersects the first axis (X1) by an uppermost included angle (θ1) ranging from 10 degrees to 30 degrees, e.g., the uppermost included angle (θ1) may be 20 degrees. At the lowermost position, the second abutting surface portions 415 of the swing arm 41 respectively abut against and are stopped by the second stop surfaces 325 of the base seat 32 to keep the extension arm unit 4 at the lowermost position, and the extension arm unit 4 intersects the first axis (X1) by a lowermost included angle (θ2) ranging from 40 degrees to 60 degrees, e.g., the lowermost included angle (θ2) is 50 degrees.

Figure 2:
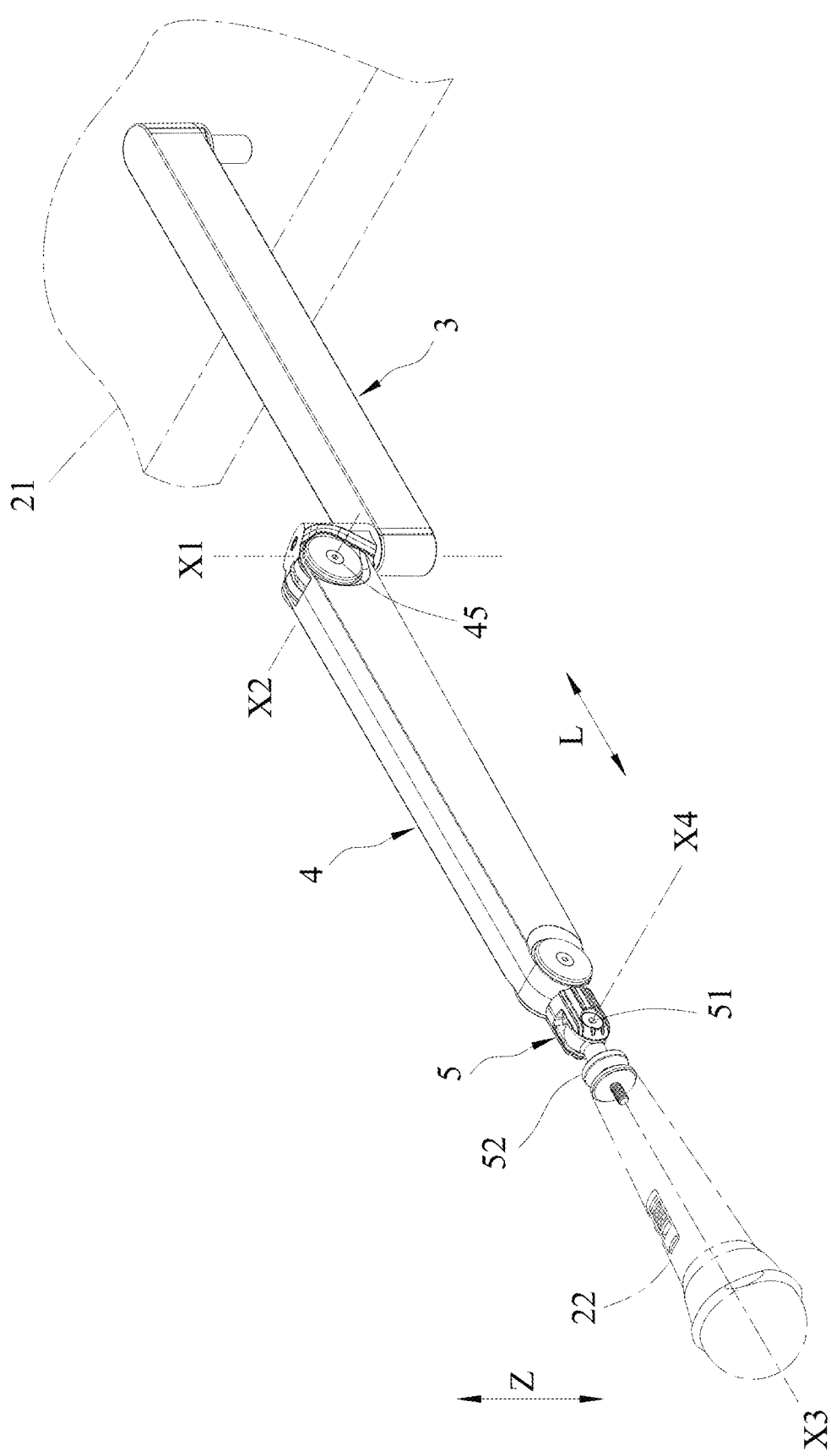
FIG. 2 is a perspective view illustrating an embodiment of a support device according to the disclosure for connecting a fixed object and a portable object.
Figure 3:
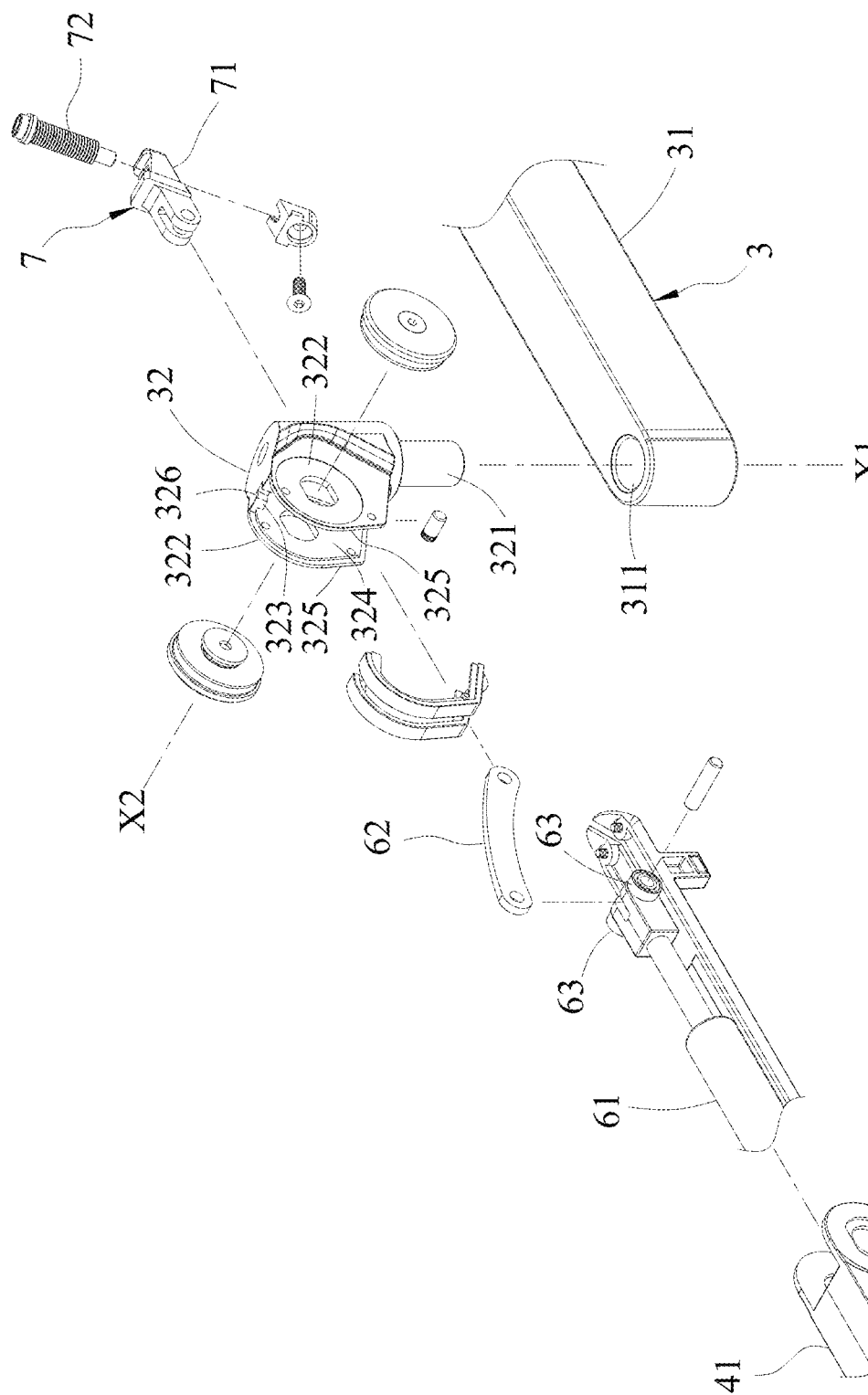
FIG. 3 is a fragmentary, exploded perspective view of the embodiment.
Figure 4:
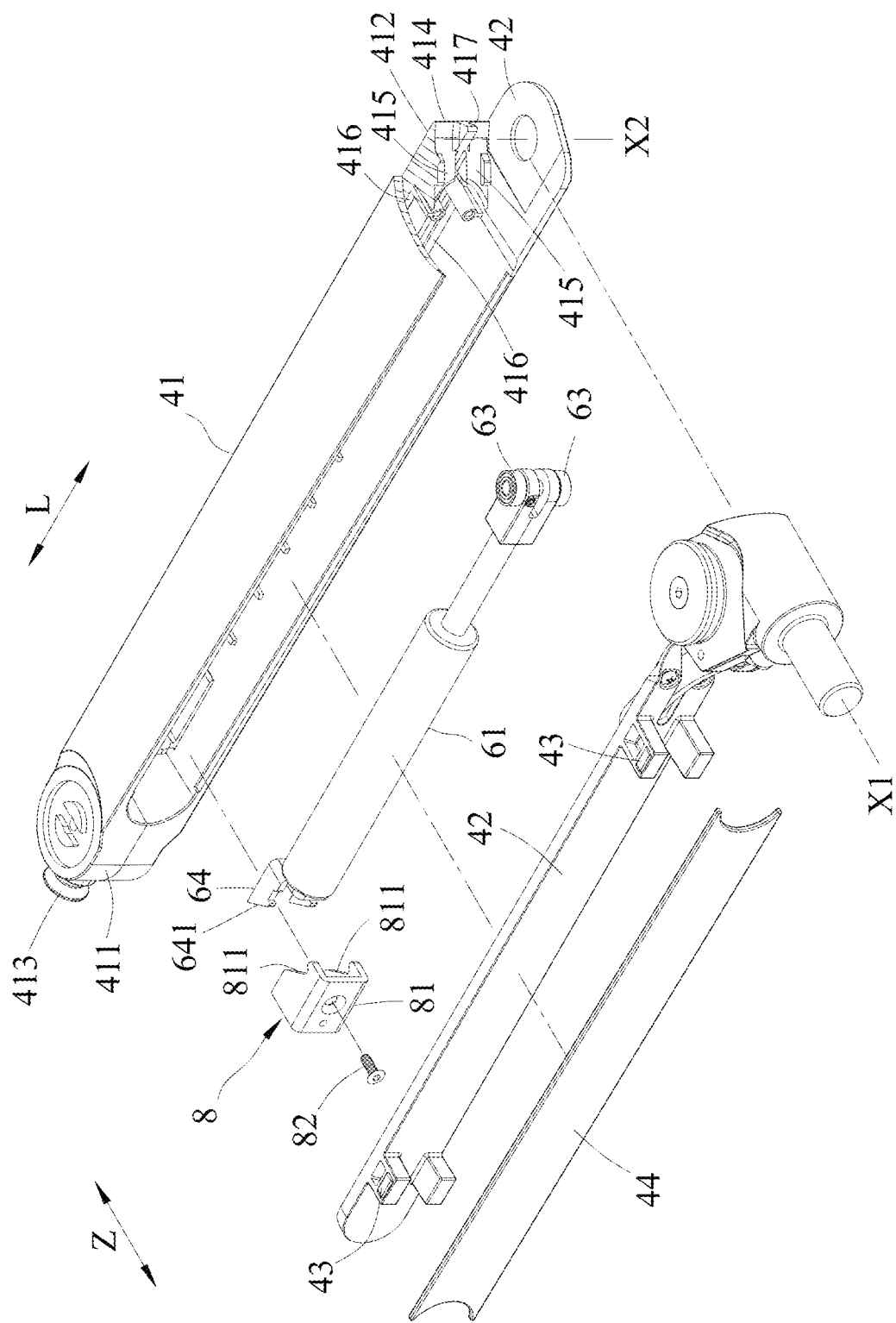
FIG. 4 is a fragmentary, exploded perspective view of the embodiment.
Figure 5:
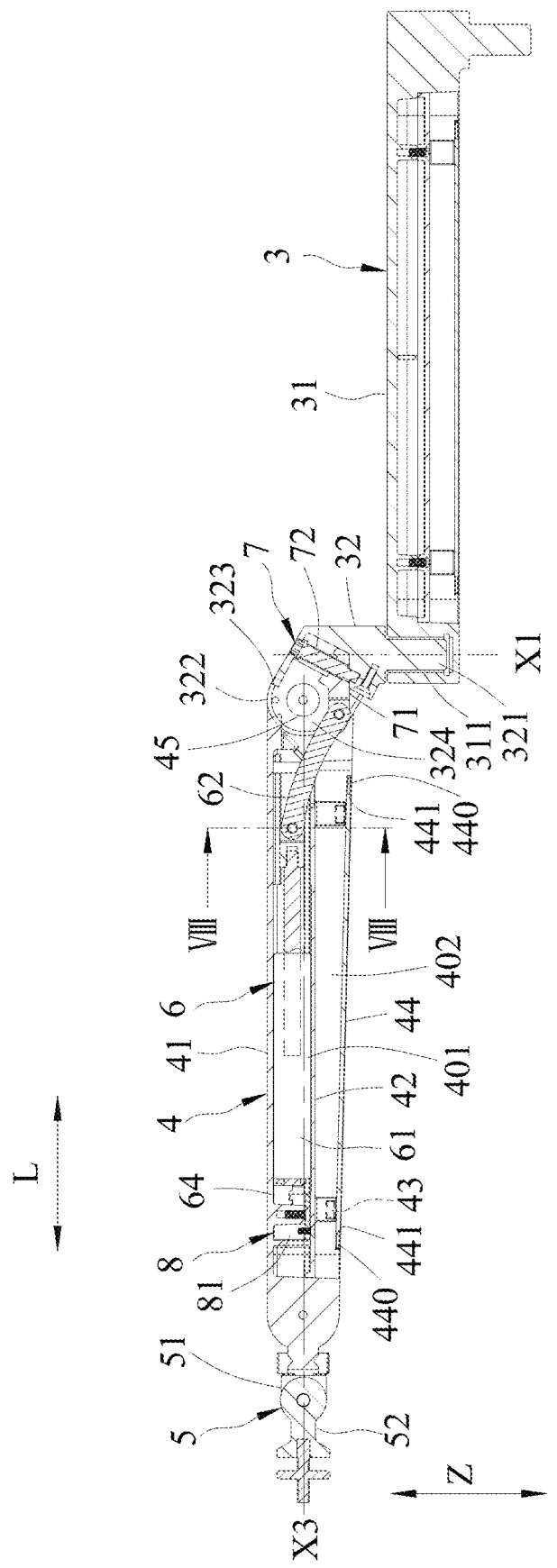
FIG. 5 is a sectional view of the embodiment.

With reference to FIGS. 2 and 5, the carrying unit 5 includes a lug seat 51 which is sleeved on the sleeved portion 413 of the swing arm 41 to be rotatable about a third axis (X3) that is substantially transverse to the directions of the first axis (X1) and the second axis (X2), and a carrying member 52 which is connected with the lug seat 51 to be swingable about a fourth axis (X4) that is parallel to the second axis (X2) for carrying the movable object 22.

With reference to FIGS. 3, 4, 5 and 8, the flexible unit 6 extends along the lengthwise direction (L) and is disposed in the mounting space 401. The flexible unit 6 includes a biasing member 61 which is retainingly received between the swing arm 41 and the lower seat 42, a transmitting member 62, two rolling members 63 and a pressed member 64.

In this embodiment, the biasing member 61 is in the form of a compressed air spring, such as a pneumatic cylinder, or a hydrospring, such as a hydraulic cylinder, and is stretchable and retractable along the lengthwise direction (L). The biasing member 61 has an extendable stroke along the lengthwise direction (L) which is smaller than the length of the rail surface portion 416 along the lengthwise direction (L). The transmitting member 62 has one end pivotably connected with an end of the biasing member 61, and is partially received in the moving space 324. In this embodiment, the transmitting member 62 is in the form of a linking bar which extends arcuately and faces the wiring access opening 440 adjacent to the base seat 32 so as to prevent the transmitting member 62 interfering with the wiring assembly in the wiring space 402. The rolling members 63 are rollably mounted on the biasing member 61 and are respectively contacting and slidable along the rail surface portions 416 during stretching and retraction of the biasing member 61. For example, each rolling member 63 is in the form of a bearing. The pressed member 64 is connected with an opposite end of the biasing member 61, and has two pressed slopes 641 which are spaced apart from each other along the direction of the fourth axis (X4).

With reference to FIGS. 3, 5, 9 and 10, the adjusting unit 7 includes a movable seat 71 which is disposed in the moving space 324 and movable relative to the base seat 32 substantially along the up-down direction (Z), and a resistance adjusting member 72 which is operable to move the movable seat 71. Specifically, the movable seat 71 is pivotably connected with the other end of the transmitting member 62. In this embodiment, the resistance adjusting member 72 is in the form of a bolt which extends in the up-down direction (Z) through the base seat 32 and is threadedly engaged with the movable seat 71.

Figure 9:
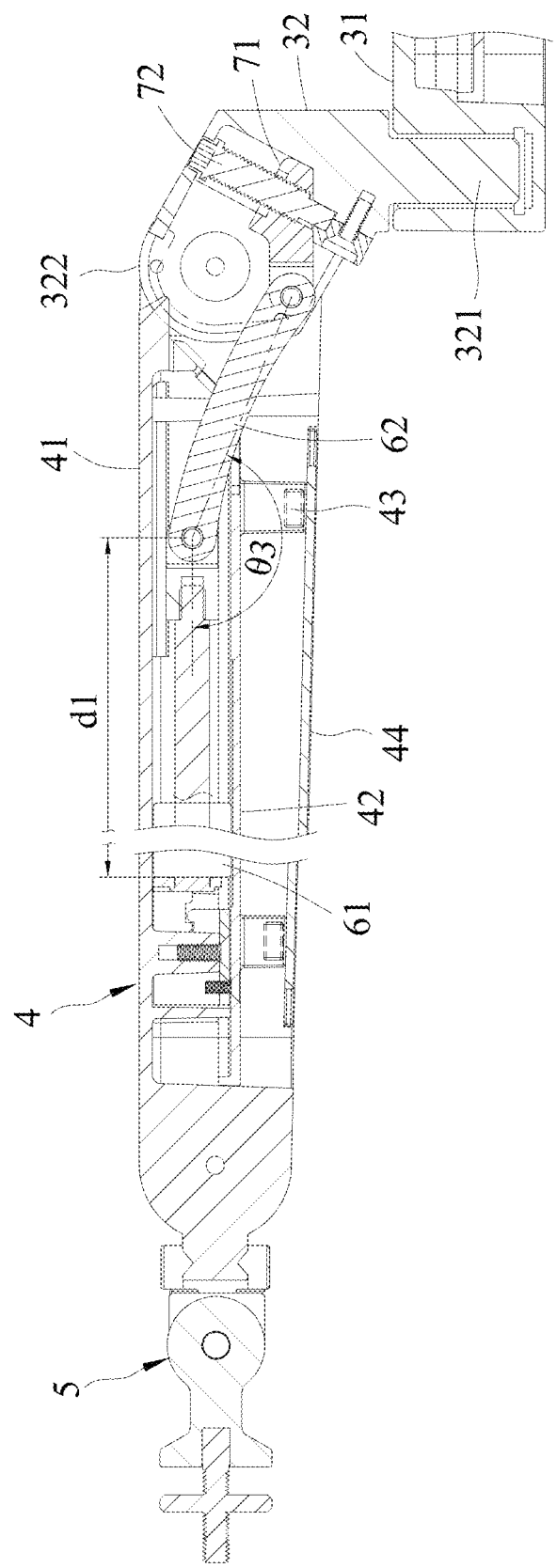
FIG. 9 is a fragmentary sectional view illustrating a movable seat of the embodiment in a higher loaded position.
Figure 10:
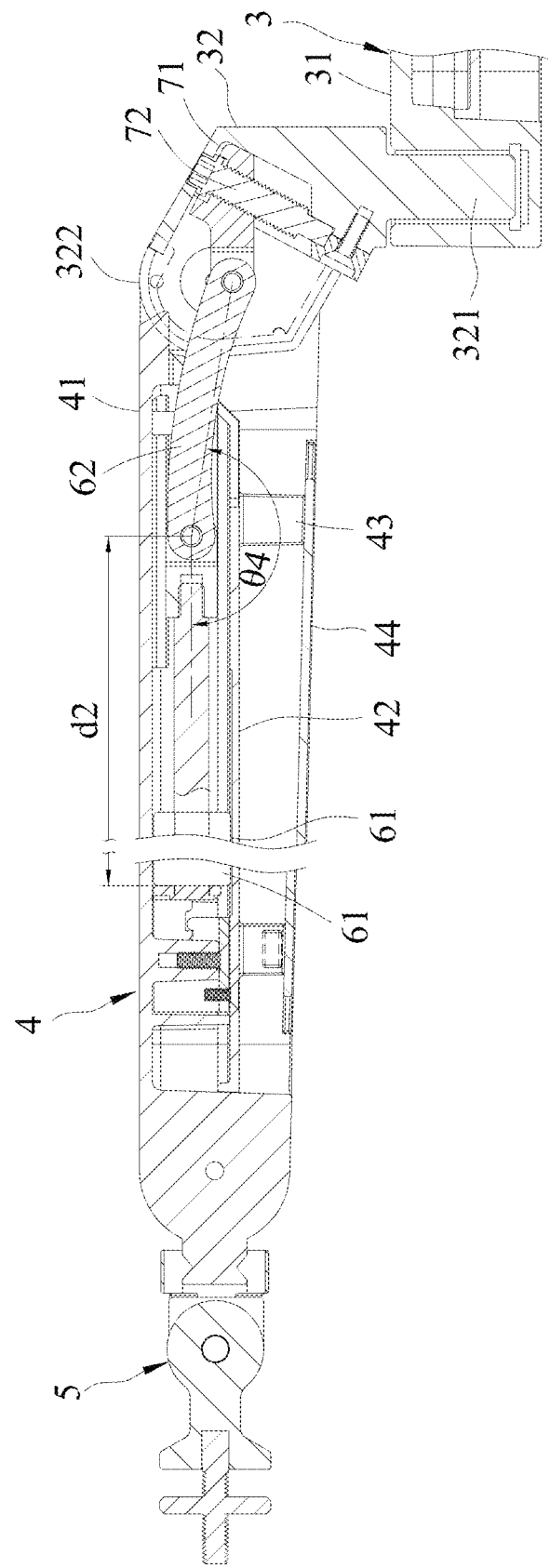
FIG. 10 is a fragmentary sectional view illustrating the movable seat in a lower loaded position.
Figure 11:
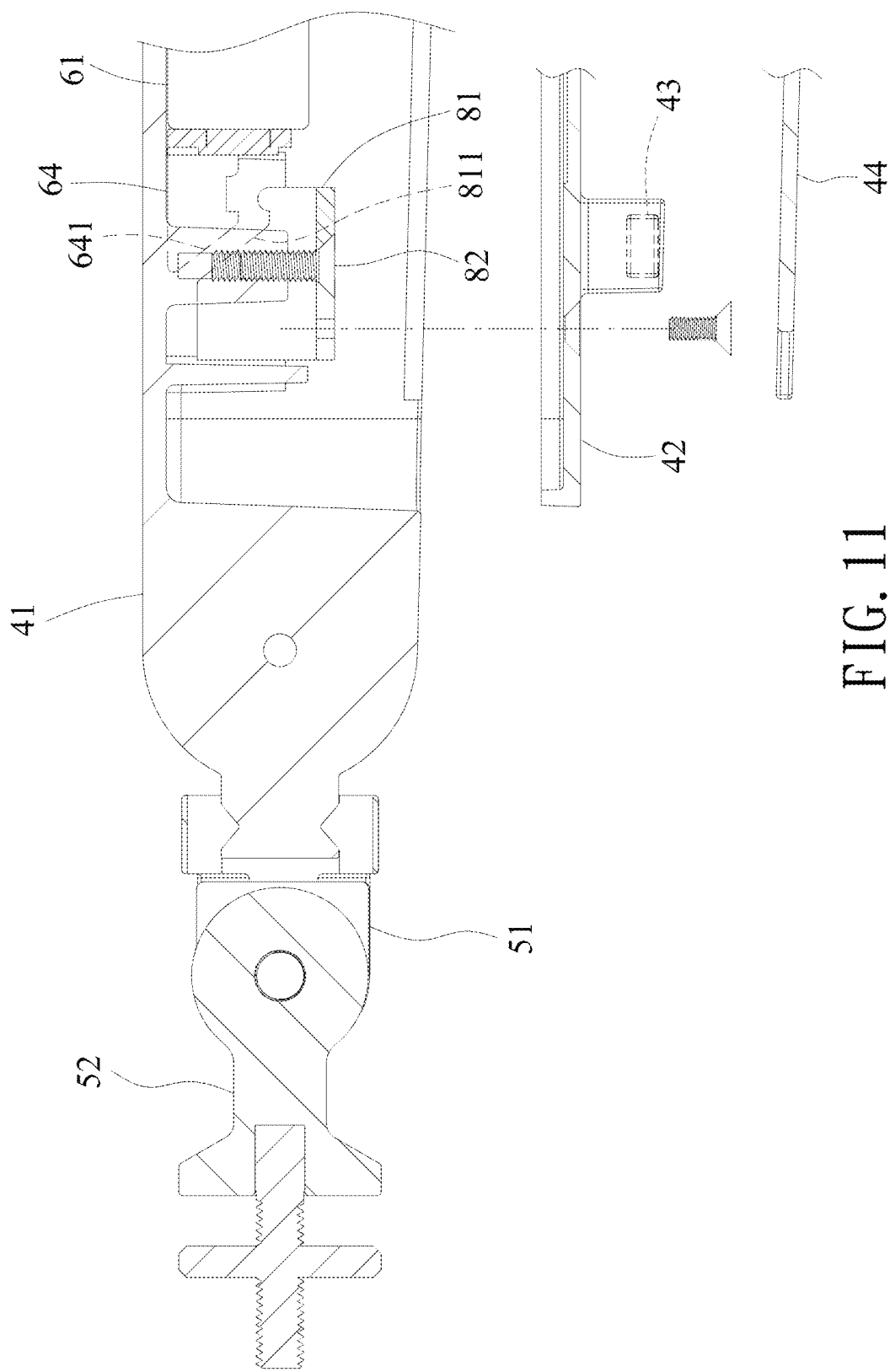
FIG. 11 is a fragmentary sectional view illustrating a preloaded member of the embodiment in a first preloaded position.
Figure 12:
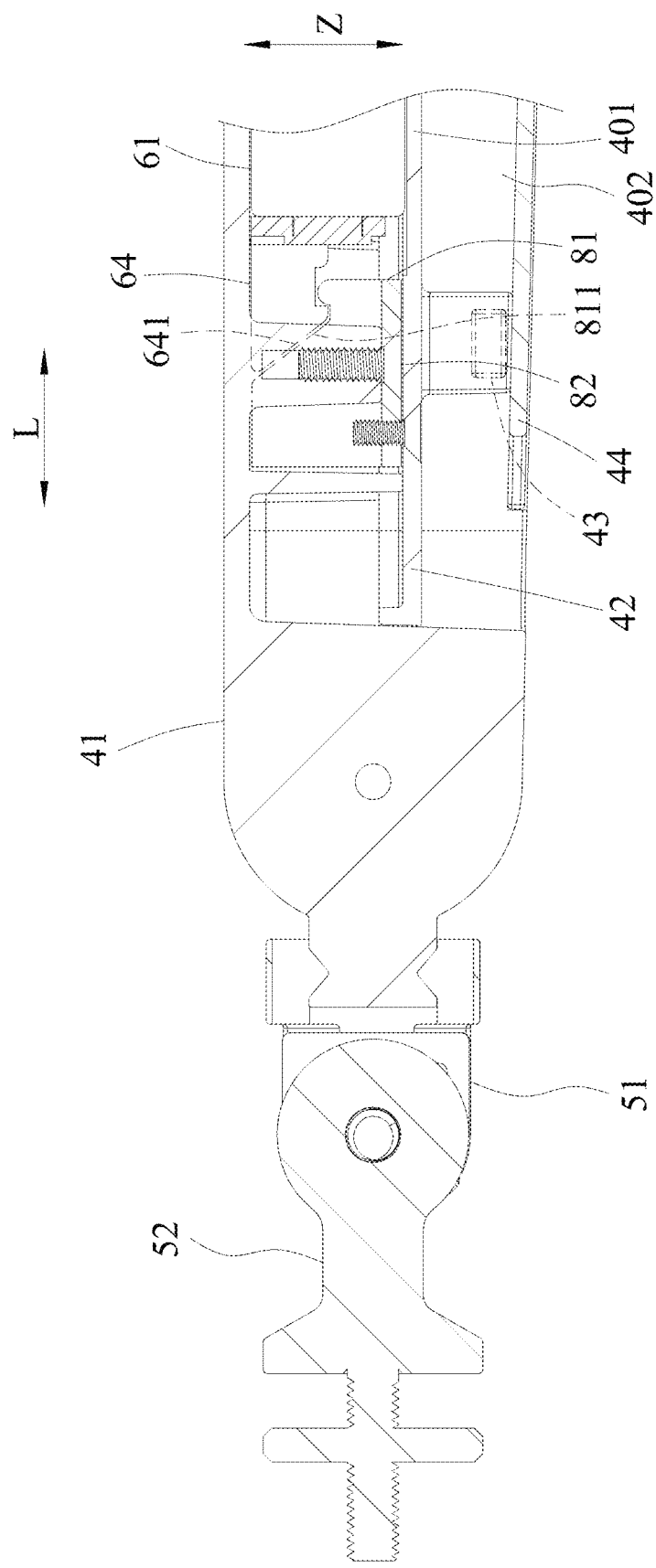
FIG. 12 is a fragmentary sectional view illustrating the preloaded member in a second preloaded position.

The movable seat 71 is movable relative to the base seat 32 substantially along the up-down direction (Z) between a higher loaded position (as shown in FIG. 9) and a lower loaded position (as shown in FIG. 10). Specifically, the biasing member 61 defines along the lengthwise direction (L) a first length (d1) in the higher loaded position and a second length (d2) in the lower loaded position. The second length (d2) is greater than the first length (d1). Also, the transmitting member 62 intersects the biasing member 61 by a first working angle (θ3) in the higher loaded position and a second working angle (θ4) in the lower loaded position. The second working angle (θ4) is larger than the first working angle (θ3).

With reference to FIGS. 4, 5, 11 and 12, the preloaded unit 8 is connected with the swing arm 41, and includes a preloaded member 81 which is movably mounted in the mounting space 401 to urge the biasing member 61 with a predetermined preloaded force, and a preload adjusting member 82 which is operable to move the preloaded member 81. The preloaded member 81 is disposed to face the pressed member 64, and has two preloaded slopes 811 which respectively abut against the pressed slopes 641 of the pressed member 64. In this embodiment, the preload adjusting member 82 is in the form of a bolt which extends along the direction of the first axis (X1) through the preloaded member 81 and is threadedly engaged with the swing arm 41.

In assembly of the preloaded unit 8, when the biasing member 61 is pivotally connected with the movable seat 71 through the transmitting member 62 and is not retained to the extension arm unit 4, the biasing member 61 is firstly abutted against the inner wall of the swing arm 41, and the preload adjusting member 82 is extended through the preloaded member 81 and is threadedly engaged with the swing arm 41. During the threading-in movement of the preload adjusting member 82 along the direction of the first axis (X1), the preload adjusting member 82 brings the preloaded member 81 to move along the direction of the first axis (X1) and press the pressed member 64 along the lengthwise direction (L) so as to urge the biasing member 61. Hence, the biasing member 61 is preloaded with a predetermined preload force, and is retained by the preloaded member 81 and the movable seat 71 so as to prevent sway of the biasing member 61 and noise.

Subsequently, the lower seat 42 is securely connected with the swing arm 41 and the preloaded member 81 such that the biasing member 61 is retainingly received between the swing arm 41 and the lower seat 42. Alternatively, in other embodiments, the lower seat 42 may be directly secured to the swing arm 41. Furthermore, the biasing member 61 may be a mechanical spring.

With reference to FIGS. 6 to 9, in operation, when the extension arm unit 4 is operated to move along the up-down direction (Z) from the uppermost position toward the lowermost position, or from the lowermost position toward the uppermost position, the extension arm unit 4 is swung about the second axis (X2) relative to the support bracket unit 3. Meanwhile, the extension arm unit 4 compresses or tenses the biasing member 61 through the connection of the transmitting member 62 with the biasing member 61 and the movable seat 71 so as to acquire a support force to suspend and position the movable object 22.

It is noted that, during the compression of the biasing member 61 by the transmitting member 62, or the tensing of the biasing member 61 by the transmitting member 62, the rolling members 63 slide on and along the rail surface portions 416 with the stretching and retraction of the biasing member 61 along the lengthwise direction (L). Thus, through the rolling of the rolling members 63, the straightness of the biasing member 61 is supported and maintained, and the frictional resistance to the biasing member 61 during the stretching and retraction thereof is decreased so as to enhance smooth operation of the extension arm unit 4.

It is also noted that, the extension arm unit 4 is subject to a downward loaded force (e.g., the weight of the movable object 22) in the loaded state, and the biasing member 61 provides an upward support force opposite to the downward loaded force. Thus, the rolling members 63 are provided to be in upward contact with the rail surface portions 416 of the swing arm 41 so as to obtain an appropriate support effect. It should be noted that the rolling members 63 may be disposed in contact with the lower seat 42, or in contact with both the swing arm 41 and the lower seat 42.

With reference to FIGS. 5, 9 and 10, when it is desired to adjust the loading capacity of the flexible unit 6, the resistance adjusting member 72 is screwed clockwise or counterclockwise to move the movable seat 71 along the up-down direction (Z). Thus, when the movable seat 71 is in the higher loaded position as shown in FIG. 9, the biasing member 61 is compressed and retracted to increase the fluid pressure within the biasing member 61 and generate a larger support force. When the movable seat 71 is in the lower loaded position as shown in FIG. 10, the biasing member 61 is tensed and stretched to decrease the fluid pressure within the biasing member 61 and generate a smaller support force. Thus, the loading capacity of the flexible unit 6 is adjusted.

Also, when the movable seat 71 is in the lower loaded position, there is a relatively larger working angle (i.e., the second working angle (θ4)) included between the transmitting member 62 and the biasing member 61, and the biasing member 61, the transmitting member 62 and the movable seat 71 are substantially aligned with one another along the lengthwise direction. Thus, when the extension arm unit 4 sways along the up-down direction (Z), the transmitting member 62 can directly compress or tense the biasing member 61 in a substantially straight line direction so as to decrease the retarding feel of a user when operating the extension arm unit 4. When the movable seat 71 is in the higher loaded position, there is a relatively smaller working angle (i.e., the first working angle (θ3)) included between the transmitting member 62 and the biasing member 61, and the biasing member 61, the transmitting member 62 and the movable seat 71 are misaligned with one another along the lengthwise direction (L) so as to provide an obvious resisting force on a user when operating the extension arm unit 4.

Figure 13:
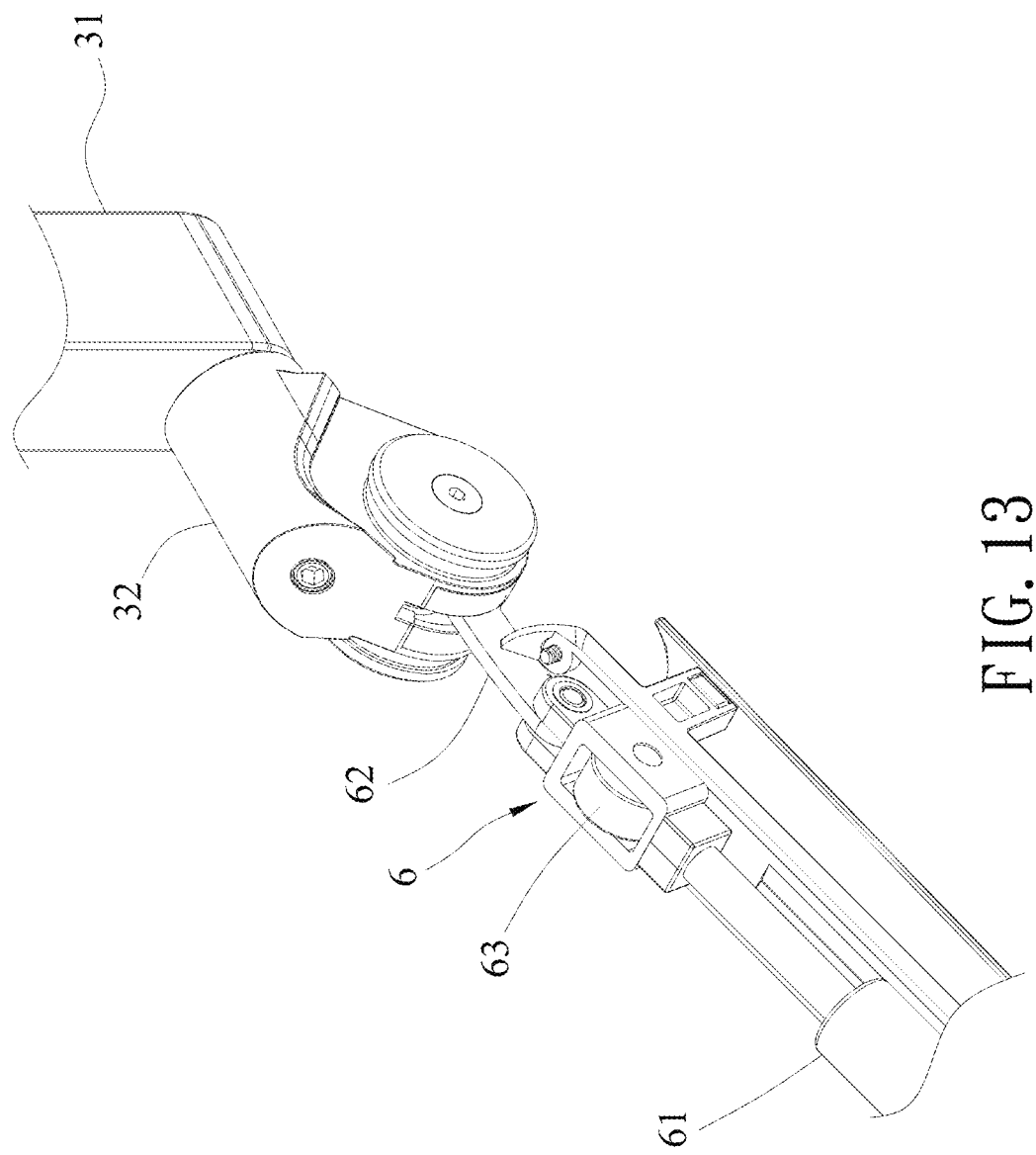
FIG. 13 is a fragmentary perspective view illustrating a flexible unit of the embodiment in a modified form.

It is noted that the number of the rolling members 63 may be varied. For example, in a modified form as shown in FIG. 13, the flexible unit 6 includes one rolling member 63.

As illustrated, with the rolling members 63 rollably mounted on the biasing member 61 to slide along the extension arm unit 4 during stretching and retraction of the biasing member 61, the straightness of the biasing member 61 is supported and maintained, and the frictional resistance to the biasing member 61 during the stretching and retraction thereof is decreased so as to enhance smooth operation of the extension arm unit 4. Through the adjusting unit 7, the loading capacity of the flexible unit 6 and the tactile feeling when operating the extension arm unit 4 can be adjusted, and the resistance adjusting member 72 may be turned when adjusting, which is convenient to operate and which is suitable for holding movable objects 22 with a different weight. Moreover, in assembly of the biasing member 61, the biasing member 61 can be preloaded with a predetermined preload force. Thus, the biasing member 61 is retained between the preloaded member 81 and the movable seat 71 through the biasing returning force thereof so as to prevent sway of the biasing member 61 and generating noise. Furthermore, the cover plate 44 is attractively attached to the magnets 43 to be retained on the lower seat 42, and is removed easily without requiring any tool which enhances the convenience during wiring or holding operations.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A support device, comprising:
   a support bracket unit including a suspending arm and a base seat which is rotatably connected with said suspending arm about a first axis, said base seat having a first stop surface which extends along a direction of a second axis that is transverse to a direction of the first axis, and two second stop surfaces which extend along a direction of the first axis opposite to said first stop surface;
   an extension arm unit including a swing arm which is pivotably connected with said support bracket unit about the second axis and swingable along an up-down direction relative to said support bracket unit between an uppermost position and a lowermost position, said swing arm having a first abutting surface which faces said base seat, and an inner surface which is formed with two second abutting surface portions that face said base seat such that said first abutting surface abuts against and is stopped by said first stop surface to keep said extension arm unit at the uppermost position, and such that said second abutting surface portions respectively abut against and are stopped by said second stop surfaces to keep said extension arm unit at the lowermost position; and
   a flexible unit extending along a lengthwise direction and connected with said extension arm unit and said support bracket unit, said flexible unit including a biasing member which is stretchable and retractable along the lengthwise direction, and at least one rolling member which is rollably mounted on said biasing member to slide along said extension arm unit during stretching and retraction of said biasing member.

2. The support device of claim 1, further comprising an adjusting unit, said adjusting unit including a movable seat which is movable relative to said base seat along the up-down direction, and a resistance adjusting member which is operable to move said movable seat, said flexible unit further including a transmitting member which is pivotably connected with said biasing member and said movable seat.

3. The support device of claim 2, wherein said movable seat is movable relative to said base seat along the up-down direction between a higher loaded position and a lower loaded position, wherein, said biasing member defines along the lengthwise direction a first length in the higher loaded position and a second length in the lower loaded position, that is greater than the first length, and wherein said transmitting member intersects said biasing member by a first working angle in the higher loaded position, and a second working angle in the lower loaded position that is larger than the first working angle, said resistance adjusting member extending in the up-down direction through said base seat and being threadedly engaged with said movable seat.

4. The support device of claim 1, further comprising a preloaded unit, said extension arm unit further including a lower seat which is mounted on said swing arm to cooperatively define a mounting space, said preloaded unit being connected with said swing arm, and including a preloaded member which is movably mounted in said mounting space to urge said biasing member with a predetermined preloaded force, and a preload adjusting member which is operable to move said preloaded member.

5. The support device of claim 4, wherein said flexible unit is disposed in said mounting space, and further includes a pressed member which is connected with said biasing member, said pressed member having at least one pressed slope which faces said preloaded member, said preloaded member having at least one preloaded slope which abuts against said pressed slope, said preload adjusting member extending along the direction of the first axis through said preloaded member and being threadedly engaged with said swing arm to bring said preloaded member, during threading-in movement of said preload adjusting member along the direction of the first axis, to press said pressed member along the lengthwise direction so as to urge said biasing member.

6. The support device of claim 1, wherein said extension arm unit is rotatable about the first axis, and is swingable between the uppermost position, where said extension arm unit intersects the first axis by an uppermost included angle ranging from 10 degrees to 30 degrees, and the lowermost position, where said extension arm unit intersects the first axis by a lowermost included angle ranging from 40 degrees to 60 degrees.

7. The support device of claim 6, wherein said extension arm unit is swingable about the second axis that is substantially transverse to the lengthwise direction, said extension arm unit further including a lower seat which is mounted on said swing arm to cooperatively define a mounting space, said flexible unit being disposed in said mounting space, said biasing member being in form of a compressed air spring or a hydrospring and being retainingly received between said swing arm and said lower seat.

8. The support device of claim 7, wherein said inner surface of said swing arm is formed with two rail surface portions that extend along the lengthwise direction, said rail surface portions being spaced apart from each other in the direction of the second axis and from said lower seat in the direction of the first axis, said flexible unit including two of said rollers which are respectively mounted on and slidable along said rail surface portions.

\* \* \* \* \*